Figure 1:
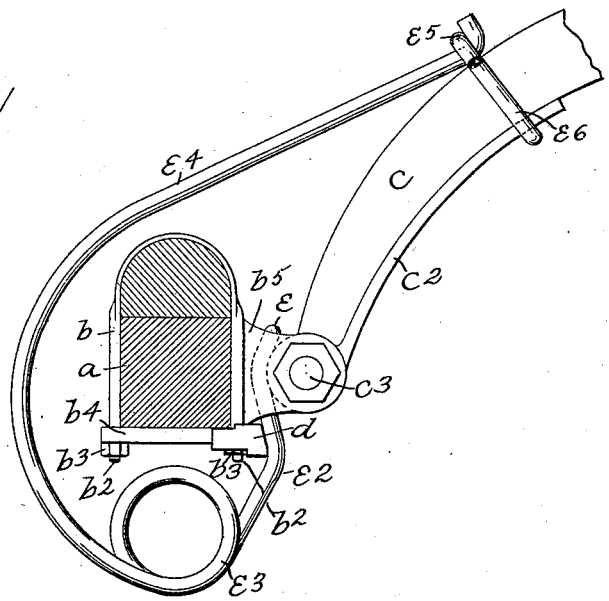

No. 718,820. PATENTED JAN. 20, 1903.
J. B. COOKE.
ANTIRATTLER THILL SUPPORT.
APPLICATION FILED MAY 19, 1902.

NO MODEL.

WITNESSES
J. C. Larsen
F. A. Stewart

INVENTOR
John B. Cooke
BY Edgar Tate & Co
ATTORNEYS

UNITED STATES PATENT OFFICE.

JOHN BROKOW COOKE, OF BOSTON, MASSACHUSETTS.

ANTIRATTLER THILL-SUPPORT.

SPECIFICATION forming part of Letters Patent No. 718,820, dated January 20, 1903.

Application filed May 19, 1902. Serial No. 107,888. (No model.)

*To all whom it may concern:*

Be it known that I, JOHN BROKOW COOKE, a citizen of the United States, residing at Boston, in the county of Suffolk and State of Massachusetts, have invented certain new and useful Improvements in Antirattler Thill-Supports, of which the following is a full and complete specification, such as will enable those skilled in the art to which it appertains to make and use the same.

The object of this invention is to provide an improved antirattler thill-support for the shafts of vehicles; and the invention is fully disclosed in the following specification, of which the accompanying drawings form a part, in which the separate parts of my improvement are designated by the same reference characters in each of the views, and in which—

Figure 2:
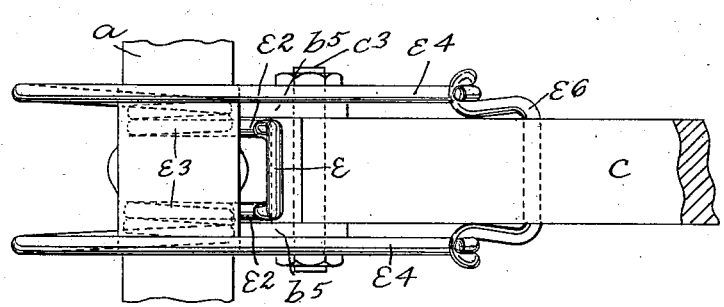
Figure 3:
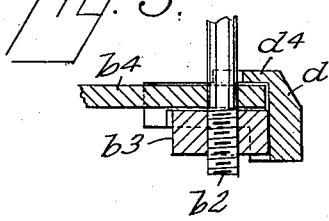
Figure 4:
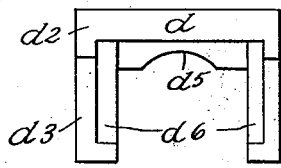

Figure 1 is a transverse section of the front axle of a vehicle and showing one of the shafts connected therewith and my improved antirattler-shaft attachment and support; Fig. 2, a plan view thereof; Fig. 3, a sectional side view of the parts thereof; Fig. 4, a bottom view of a part of the construction shown in Fig. 3, and Fig. 5 a top plan view thereof.

In the drawings forming part of this specification I have shown at $a$ the front axle of a vehicle with which is connected in the usual manner a stirrup $b$, the opposite sides of which are provided with screw-threaded shanks $b^2$, each of which is provided with a nut $b^3$, and mounted on the screw-threaded shanks $b^2$ is a transverse bottom plate $b^4$, which forms a part of the stirrup $b$. The stirrup $b$ is also provided with forwardly-directed jaws $b^5$, and I have also shown at $c$ one of the shafts of a vehicle, and this shaft is provided in the usual manner with a metal plate $c^2$, having a head $c^3$, which fits between the jaws $b^5$, and is secured in position by a bolt $c^3$, all this construction being substantially of the well-known form.

Figure 5:
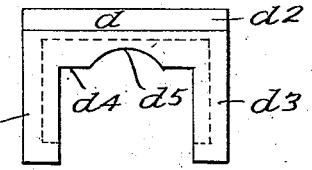

Connected with the lower end of the front side of the stirrup $b$ or with the shank thereof is an attachment $d$, which is shown in transverse section in Fig. 3, in bottom plan view in Fig. 4, and in top plan view in Fig. 5, and this attachment comprises a transverse front member $d^2$ and side members $d^3$, which project backwardly, and these side members $d^3$ straddle the corresponding nut $b^3$, and the front member $d^2$ is provided with a backwardly-directed flange $d^4$, which overlaps the end of the plate $b^4$, and this flange is provided with a segmental recess $d^5$ to receive the sides of the stirrup $b$ above the plate $b^4$.

The sides $d^3$ of the attachment $d$ are preferably provided in their under sides with grooves or recesses $d^6$, which receive the sides of the corresponding nut $b^3$, and this attachment is preferably slipped into place after said nut has been secured home, or the parts may be so arranged that the said nut may be secured home after the attachment has been placed in position.

The antirattling device and support proper is made of strong spring wire bent centrally, as shown at $e$, and the sides of which are bent downwardly and backwardly, as shown at $e^2$, and formed into spring-rings $e^3$, and then bent backwardly and upwardly and forwardly to form spring-arms $e^4$, the front ends of which are connected, as shown at $e^5$, with a ring band or strip $e^6$, placed on the shaft $c$, as shown in Figs. 1 and 2, and in connecting this attachment or securing it in position the loop-shaped portion $e^2$ is passed upwardly between the attachment $d$ and the head of the shaft $c$, and the arms $e^4$ are bent forwardly and over the axle and connected with the ring band or strip $e^6$, and the spring-arms $e^4$ hold the shaft in the raised position, and the looped portion $e^2$ of the antirattler attachment proper presses with great force on the head of the shaft $c$ and on the attachment $d$ and prevents any rattling of the shaft.

It will be understood that in practice two of the shafts $c$ are employed and two of the antirattler attachments, and the said attachments always hold the shafts in proper position and prevent any rattling or jarring thereof in the use thereof.

The entire device is simple in construction and operation and perfectly adapted to accomplish the result for which it is intended, and changes in and modifications of the construction described may be made without departing from the spirit of my invention or sacrificing its advantages.

Having fully described my invention, what I claim as new, and desire to secure by Letters Patent, is—

A vehicle-axle provided with a stirrup having forwardly-directed jaws between which the shaft is pivoted, a bearing attachment detachably connected with the lower end of the front side of said stirrup, below said jaws, and a spring attachment composed of strong wire bent centrally to form a loop which is passed upwardly between said jaws and between said first-named attachment and the head of the shaft and adapted to bear on said head and on said attachment and the sides of which are bent beneath the axle to form spring-rings and also arms which are curved upwardly and forwardly over the axle and connected with the shaft, substantially as shown and described.

In testimony that I claim the foregoing as my invention I have signed my name, in presence of the subscribing witnesses, this 16th day of May, 1902.

JOHN BROKOW COOKE.

Witnesses:
GEO. E. P. RUSSELL,
ARTHUR F. BREED.